United States Patent
Chang et al.

(10) Patent No.: US 10,942,305 B2
(45) Date of Patent: Mar. 9, 2021

(54) OPTICAL IMAGE LENS ASSEMBLY, IMAGING APPARATUS AND ELECTRONIC DEVICE

(71) Applicant: LARGAN PRECISION CO., LTD., Taichung (TW)

(72) Inventors: Pei-Chi Chang, Taichung (TW); Yeo-Chih Huang, Taichung (TW)

(73) Assignee: LARGAN PRECISION CO., LTD., Taichung (TW)

(*) Notice: Subject to any disclaimer, the term of this patent is extended or adjusted under 35 U.S.C. 154(b) by 165 days.

(21) Appl. No.: 16/360,137

(22) Filed: Mar. 21, 2019

(65) Prior Publication Data
US 2019/0317257 A1    Oct. 17, 2019

Related U.S. Application Data

(60) Provisional application No. 62/655,863, filed on Apr. 11, 2018.

(30) Foreign Application Priority Data

Apr. 20, 2018    (TW) .............................. 107113603 A

(51) Int. Cl.
| | | |
|---|---|---|
| G02B 13/14 | (2006.01) | |
| G02B 5/20 | (2006.01) | |
| G02B 13/00 | (2006.01) | |

(52) U.S. Cl.
CPC .......... *G02B 5/208* (2013.01); *G02B 13/008* (2013.01); *G02B 13/0045* (2013.01); *G02B 13/14* (2013.01)

(58) Field of Classification Search
None
See application file for complete search history.

(56) References Cited

U.S. PATENT DOCUMENTS

| | | | | |
|---|---|---|---|---|
| 6,052,233 A | * | 4/2000 | Koike | ....................... G02B 9/02 |
| | | | | 359/642 |
| 2009/0097103 A1 | | 4/2009 | Tseng et al. | |
| 2018/0067242 A1 | * | 3/2018 | Lai | ..................... G02B 13/0045 |

FOREIGN PATENT DOCUMENTS

| | | |
|---|---|---|
| TW | 200918978 A | 5/2009 |
| WO | 2014080561 A1 | 5/2014 |
| WO | 2015111316 A1 | 7/2015 |

* cited by examiner

*Primary Examiner* — Darryl J Collins
(74) *Attorney, Agent, or Firm* — McClure, Qualey & Rodack, LLP

(57) ABSTRACT

An optical image lens assembly includes a plurality of optical lens elements, wherein the optical lens elements include a plurality of plastic optical lens elements having refractive power and aspheric surfaces. Wherein at least one long-wavelength red light absorbing optical lens element made of a plastic material and having refractive powers is disposed within the optical image lens assembly, and the long-wavelength red light absorbing optical lens element can be penetrated by a visible light and can filter a long-wavelength red light.

27 Claims, 5 Drawing Sheets

OPTICAL IMAGE LENS ASSEMBLY, IMAGING APPARATUS AND ELECTRONIC DEVICE

RELATED APPLICATIONS

This application claims priority to U.S. Provisional Application Ser. No. 62/655,863, filed Apr. 11, 2018, and Taiwan Application Serial Number 107113603, filed Apr. 20, 2018, which are herein incorporated by reference.

BACKGROUND

Technical Field

The present disclosure relates to a compact optical image lens assembly and an image capturing apparatus. More particularly, the present disclosure relates to an optical image lens assembly and an image capturing apparatus which include an optical lens element capable of absorbing a long-wavelength light and are applicable to electronic devices.

Description of Related Art

Conventional color image sensors usually have a response increase in the long-wavelength red light of 650 nm-700 nm and in the infrared light of 700 nm-1000 nm in both of the blue band channel and the green band channel. If the aforementioned long-wavelength red light and the infrared light are not filtered out, the image color will be reproduced and the color saturation will decrease.

In tradition, the IR cut coating filter (IRCF hereafter) and the infrared cut-off plate (commonly known as Blue Glass, BG hereafter) are used so as to filter out the long-wavelength red light in a wavelength range larger than 650 nm. However, the aforementioned method has its drawbacks. Although the IRCF has an advantage in the cost, when the incident angle of light is increased, the filtering wavelength thereof will shift toward a shorter wavelength, so that the entering amount of the red light in the peripheral region thereof will be reduced so as to cause the color shift in the peripheral region thereof relative to the central region thereof. Furthermore, although the color shift in the peripheral region relative to the central region of BG is slightly lower than the IRCF, the cost thereof is higher and is limited by the type of materials. Therefore, the infrared light cannot be sufficiently filtered, and the IRCF is still needed to be disposed on the BG.

SUMMARY

According to one aspect of the present disclosure, an optical image lens assembly includes a plurality of optical lens elements, wherein the optical lens elements include a plurality of plastic optical lens elements having refractive power and aspheric surfaces. At least one long-wavelength red light absorbing optical lens element made of a plastic material and having refractive power is disposed in the optical image lens assembly, and the long-wavelength red light absorbing optical lens element can be penetrated by a visible light and can filter a long-wavelength red light. When a transmitted distance of a chief ray passing through the long-wavelength red light absorbing optical lens element between a central field of view to a field of view in 1.0 region in an imaging region of the optical image lens assembly is CP, and a transmitted distance of the chief ray passing through the long-wavelength red light absorbing optical lens element in the central field of the optical image lens assembly is CP0, the following condition is satisfied:

$0.5 \leq CP/CP0 \leq 2.0$.

According to another aspect of the present disclosure, an image capturing apparatus includes the optical image lens assembly according to the aforementioned aspect and an image sensor, wherein the image sensor is disposed on an image plane of the optical image lens assembly.

According to still another aspect of the present disclosure, an electronic device, which is a mobile device, includes the image capturing apparatus according to the aforementioned aspect.

BRIEF DESCRIPTION OF THE DRAWINGS

The present disclosure can be more fully understood by reading the following detailed description of the embodiment, with reference made to the accompanying drawings as follows.

DETAILED DESCRIPTION

Figure 1:
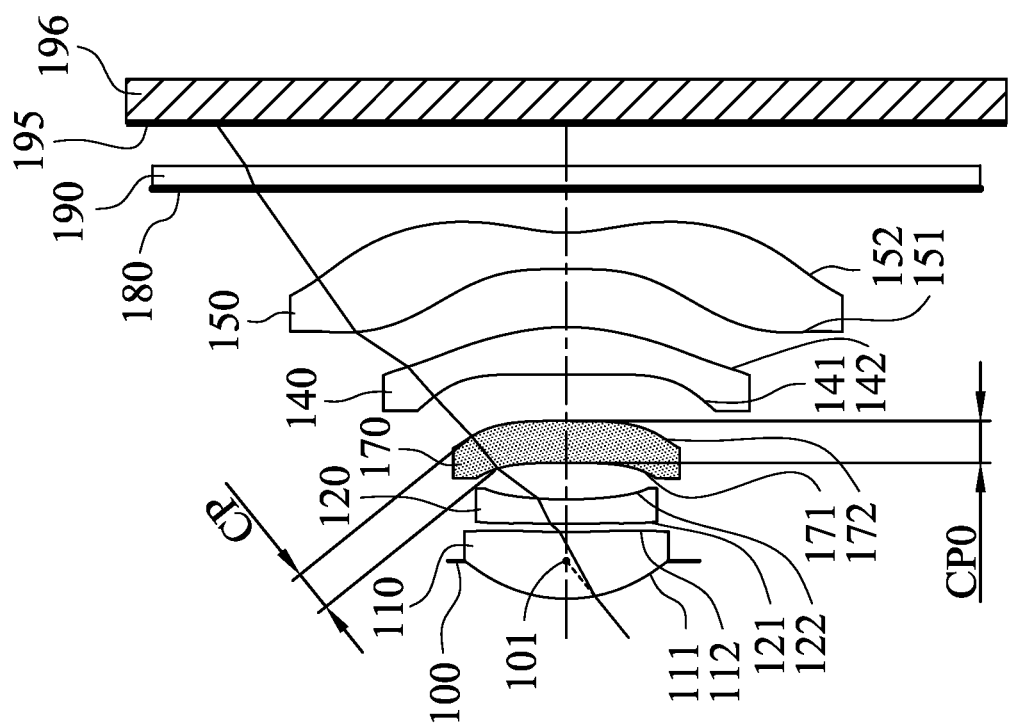
FIG. 1 is a schematic view of an image capturing apparatus according to the 1st embodiment of the present disclosure.

The present disclosure provides an optical image lens assembly including a plurality of optical lens elements, wherein the optical lens elements include a plurality of plastic optical lens elements having refractive power and aspheric surfaces. At least one long-wavelength red light absorbing optical lens element made of a plastic material and having refractive power is disposed in the optical image lens assembly, and the long-wavelength red light absorbing optical lens element can be penetrated by a visible light and can filter a long-wavelength red light.

The following condition of the long-wavelength red light absorbing optical lens element is satisfied: $0.5 \leq CP/CP0 \leq 2.0$, wherein CP is a transmitted distance of a chief ray passing through the long-wavelength red light absorbing optical lens element between a central field of view to a field of view in 1.0 region in an imaging region of the optical image lens assembly, CP0 is a transmitted distance of the chief ray passing through the long-wavelength red light absorbing optical lens element in the central field of the optical image lens assembly. Therefore, a best filtering condition of the optical image lens assembly can be reached when the CP/CP0 approaches to 1. By contrast, when the CP/CP0 is less than a lower limit of the aforementioned condition, the color saturation thereof will decrease, and when the CP/CP0 is greater than the upper limit of the aforementioned condition, the color shift in the off-axial field thereof will happen, so that the conventional infrared light filtering degree cannot be achieved. More preferably, the following condition can be satisfied: $0.8 \leq CP/CP0 \leq 1.2$. Therefore, a wavelength corresponding to a 50% transmittance of the optical lens elements can be restricted within a proper wavelength region (±7 nm).

In the optical image lens assembly according to the present disclosure, when a composite average transmittance in a wavelength range of 650 nm-700 nm of all of the long-wavelength red light absorbing optical lens elements is T6570, and a composite average transmittance in a wavelength range of 450 nm-600 nm of all of the long-wavelength red light absorbing optical lens elements is T4560, the following conditions can be satisfied: T6570≤50%; and T4560≥80%. Therefore, the long-wavelength red light can be filtered so as to prevent the image color from distortion, and it is favorable for achieving the miniaturization design of the optical image lens assembly.

In the optical image lens assembly according to the present disclosure, when a composite average transmittance in a wavelength range of 670 nm-710 nm of all of the long-wavelength red light absorbing optical lens elements is T6771, an absorbance at a wavelength 700 nm of all of the long-wavelength red light absorbing optical lens elements is A700, and an absorbance at a wavelength 550 nm of all of the long-wavelength red light absorbing optical lens elements is A550, the following conditions can be satisfied: T6771≤20%; and A700/A550≥10. Therefore, the color shift of an IR-cut coating can be suppressed.

In the optical image lens assembly according to the present disclosure, the optical image lens assembly further includes an aperture stop for controlling a maximum entering amount of light in the center of the imaging area, wherein the long-wavelength red light absorbing optical lens element is disposed adjacent to the aperture stop, and the long-wavelength red light absorbing optical lens element has positive refractive power in a paraxial region thereof. Therefore, a more favorable degree of change of CP/CP0 can be obtained, and the color shift in the peripheral region thereof can be avoided.

In the optical image lens assembly according to the present disclosure, wherein the long-wavelength red light absorbing optical lens element can have refractive power and aspheric surfaces and is formed by an injection molding method. Therefore, the loss due to the aberration can be reduced while a better value of CP/CP0 of the optical image lens assembly is achieved.

In the optical image lens assembly according to the present disclosure, wherein the plastic material of the long-wavelength red light absorbing optical lens element can be a thermoplastic material. Therefore, the optical processing accuracy of the long-wavelength red light absorbing optical lens element can be increased effectively.

In the optical image lens assembly according to the present disclosure, wherein the long-wavelength red light absorbing optical lens element can include a long-wavelength light absorbent, and the long-wavelength light absorbent is uniformly distributed in the long-wavelength red light absorbing optical lens element. Therefore, a better surface accuracy and a better processing stability can be achieved. Furthermore, the long-wavelength light absorbent can be an organic material or an organometallic compound, and can be a commercially available product suitable for being applied as a thermoplastic plastic material, such as NIR Absorb Materials for Plastic (Thermal Resin) series of QCR Solutions Corp, other similar products or products in the same level from other suppliers.

In the optical image lens assembly according to the present disclosure, an image plane is disposed on an image side of the optical image lens assembly, wherein the IR-cut coating is disposed in the optical image lens assembly or is disposed between one of the optical lens elements and the image plane. Therefore, it is favorable for filtering the infrared light and reducing the material complexion of the long-wavelength red light absorbing optical lens element, so that the processing stability can be enhanced. Furthermore, in addition to be disposed on a flat element located between the optical image lens assembly and the image plane, the IR-cut coating can also be disposed on a surface of one of the optical lens elements of optical image lens assembly which is flatter and has a smaller chief ray angle.

Furthermore, materials of cesium oxide compound, such as $CsWO_x$, can also be added into the plastic optical lens elements so as to replace with the aforementioned IR-cut coating, and it is favorable for reducing the thickness of the optical image lens assembly.

In the optical image lens assembly according to the present disclosure, wherein the IR-cut coating can be penetrated by the visible light and can filter the long-wavelength red light, and when a wavelength corresponding to a 50% transmittance of the IR-cut coating is WLT50, the following condition can be satisfied: WLT50≥670 nm. Therefore, the shift of the filtering wavelength toward a shorter wavelength of the IR-cut coating in the peripheral field of view can be shaded by the long-wavelength red light absorbing optical lens element so as to reduce the significance of the color shift in the centrer or the peripheral region. More preferably, the following condition can be satisfied: WLT50≥690 nm, and an IR-cut coating with more coating layers can be used. Therefore, the shift of the filtering wavelength toward the shorter wavelength of the IR-cut coating can be fully shaded by the long-wavelength red light absorbing optical lens element. More preferably, the following condition can be satisfied: WLT50≤730 nm. Therefore, it is favorable for simplifying the composition of the long-wavelength red light absorbing optical lens element and improving the production stability. Furthermore, the aforementioned wavelength region corresponding to a 50% transmittance of the IR-cut coating is a wavelength region falls between the region of the visible red light and a near infrared light.

In the optical image lens assembly according to the present disclosure, the optical image lens assembly can further include a cover glass, and the IR-cut coating is disposed on at least one surface of the cover glass. Therefore, it is favorable for reducing the color shift in the peripheral region thereof by arranging the proper variable degree of CP/CP0.

In the optical image lens assembly according to the present disclosure, a number of the long-wavelength red light absorbing optical lens element can be one. Therefore, it is favorable for maintaining the filtering effect to the long-wavelength red light and satisfying a better cost-effectiveness. Furthermore, instead of including one long-wavelength red light absorbing optical lens element, the optical image lens assembly can include more than two long-wavelength red light absorbing optical lens elements according to the actual needs so as to increase the width of the range of the filtering wavelength.

In the optical image lens assembly according to the present disclosure, when an f-number of the optical image lens assembly is FNO, a maximum chief ray angle of the optical image lens assembly is CRAmax, a distance from an object side of the optical image lens assembly to an image plane thereof is TTL, and a maximum image height of the optical image lens assembly is IMGH, the following conditions can be satisfied: FNO≤2.4; CRAmax≥20; and 0.8≤TTL/IMGH≤3.0. Therefore, the entering amount of light can be increased. Because the entering amount of light is too low to exert the effect of long-wavelength light absorbent, appropriately adjusting the ratio of the total length to the image height of the optical image lens assembly can effectively reduce the volume of the optical image lens assembly and achieve the demands of miniaturization.

Each of the aforementioned features of the optical image lens assembly of the present disclosure can be utilized in numerous combinations, so as to achieve the corresponding functionality.

In the optical image lens assembly according to the present disclosure, if the optical image lens assembly includes two of the long-wavelength red light absorbing optical lens elements, the composite average transmittance in the wavelength range of 650 nm-700 nm of all of the long-wavelength red light absorbing optical lens elements T6570 is a product of the two T6570 values of the two long-wavelength red light absorbing optical lens elements, respectively. Furthermore, if the optical image lens assembly includes more than two of the long-wavelength red light absorbing optical lens elements, the value of T6570 is calculated according to the aforementioned method, too.

In the optical image lens assembly according to the present disclosure, the chief ray of the optical image lens assembly is a light which passes a center of the entrance pupil, and the definition of the maximum image height of the imaging area is the field of view in 1.0 F.

In the optical image lens assembly according to the present disclosure, the aperture stop can be a front aperture stop or a middle aperture stop, and the arrangement of the aperture stop is for controlling the maximum amount of the entering light in the center of the imaging area of the optical image lens assembly, wherein the front aperture stop is an aperture stop disposed on an object side of the first optical lens element of the optical image lens assembly, and the middle aperture stop is an aperture stop disposed between the first optical lens element and the image plane. If the aperture stop of the optical image lens assembly is the front aperture stop, a distance between an exit pupil thereof and the image plane can be larger so as to have an of telecentric effect and improve the image accepting effectivity of the image sensor such as CCD or CMOS. If the aperture stop of the optical image lens assembly is the middle aperture stop, the angle of the field of view of the optical image lens assembly can be broaden, so that the optical image lens assembly can have an advantage of wide angle.

In the optical image lens assembly according to the present disclosure, the optical image lens assembly can include at least one stop disposed in front of the first optical lens element, between the optical lens elements, or back to the last optical lens element thereof. Furthermore, the type of the stop can be a glare stop or a field stop so as to reduce stray light and enhance the image quality.

Furthermore, the optical image lens assembly according to the present disclosure can be equipped with an aperture stop, a barrel member, a light blocking element, a fixing element, a cover glass, a light filtering element, and so on.

In the optical image lens assembly according to the present disclosure, the optical lens elements and the long-wavelength red light absorbing optical lens element can be made of a plastic material. When a material of the optical lens elements is a plastic material, the production costs can be effectively reduced. Furthermore, each of an object-side surface and the image-side of the optical image lens assembly can be an aspheric surface (ASP). The aspheric surface can be made into a shape other than a spherical shape, so that more control variables can be obtained so as to reduce aberration and lower the equipped number of the optical lens elements, and the total length of the optical image lens assembly can be reduced effectively. Furthermore, the plastic material can also be replaced with a resin material.

In the optical image lens assembly according to the present disclosure, if the surfaces of the optical lens elements are convex and the convex position is not defined, it means that the surfaces of the optical lens elements can be convex in a paraxial region thereof, and if the surfaces of the optical lens elements are concave and the concave position is not defined, it means that the surfaces of the optical lens elements can be concave in a paraxial region thereof. Furthermore, in the optical image lens assembly according to the present disclosure, a focal length of the optical lens element means a focal length in the paraxial region thereof, and if the optical lens element has positive refractive power or negative refractive power, it means the optical lens element have refractive power in the paraxial region thereof. Moreover, the position of the refractive power of the optical lens element can be located on the optical axis, in the off-axial region thereof or in the peripheral region thereof.

In the optical image lens assembly according to the present disclosure, depending on the corresponding image sensor thereof, the image plane can be a plane or a curved surface having any curvature. In particular, the curved surface can be a curved surface being concave toward the object side thereof.

Furthermore, the optical image lens assembly according to the present disclosure can be applied to the three-dimensional (3D) image capturing, digital cameras, mobile products, digital tablets, smart TVs, network monitoring devices, somatosensory game consoles, driving recorders, reversing and developing devices, wearable products, and other electronic devices. The aforementioned electronic devices are used to demonstrate the practical applications of the present disclosure only, and the applications of the image capturing apparatus according to the present disclosure are not limited thereto.

The present disclosure provides an image capturing apparatus including the optical image lens assembly according to the aforementioned aspect and an image sensor. The image sensor is disposed on the image plane of the optical image lens assembly. By the arrangement of the long-wavelength red light absorbing optical lens element in the optical image lens assembly and a proper transmitted distance for passing through the chief ray, it is favorable for obtaining a better local color saturation, and the color shift in the off-axial field can be avoided so as to enhance the filtering degree of the infrared light. More preferably, the image capturing apparatus can further include a barrel member, a holder member, or a combination thereof.

The present disclosure provides an electronic device, which can be a mobile device, includes the image capturing apparatus according to the aforementioned aspect. Therefore, the image quality can be effectively enhanced. More preferably, the electronic device can further include a control unit, a display, a storage unit, a random-access memory (RAM), or the combination thereof.

According to the above description of the present disclosure, the following specific embodiments are provided for further explanation.

1st Embodiment

FIG. 1 is a schematic view of an image capturing apparatus according to the 1st embodiment of the present disclosure. As shown in FIG. 1, the image capturing apparatus of the 1st embodiment includes an optical image lens assembly (reference number is omitted) and an image sensor 196. The optical image lens assembly includes a center of an entrance pupil 101. The optical image lens assembly includes, in order from an object-side to an image-side, an aperture stop 100, a first optical lens element 110, a second optical lens element 120, a long-wavelength red light absorbing optical lens element 170, a fourth optical lens element 140, a fifth optical lens element 150, an IR-cut coating 180, a cover glass 190 and an image plane 195, wherein the image sensor 196 is disposed on the image plane 195 of the optical image lens assembly.

The first optical lens element 110 has positive refractive power, and both of an object-side surface 111 and an image-side surface 112 of the first optical lens element 110 are aspheric. The first optical lens element 110 is made of a plastic material, wherein the plastic material can be a COC/COP material, such as the APL series or the ZEON series of Mitsui Chemicals.

The second optical lens element 120 has negative refractive power, both of an object-side surface 121 and an image-side surface 122 of the second optical lens element 120 are aspheric, and the second optical lens element 120 is made of a plastic material.

The long-wavelength red light absorbing optical lens element 170 has negative refractive power, and both of an object-side surface 171 and an image-side surface 172 of the long-wavelength red light absorbing optical lens element 170 are aspheric. A plastic material of the long-wavelength red light absorbing optical lens element 170 is a thermoplastic material, and the long-wavelength red light absorbing optical lens element 170 is formed by an injection molding method. The plastic material of the long-wavelength red light absorbing optical lens element 170 is a high refractive polycarbonate (PC) material such as the EP series of MGC or the SP series of TEIJIN.

Furthermore, the plastic material of the long-wavelength red light absorbing optical lens element 170 can be replaced with the polyester material such as the OKP series of the OGC. The long-wavelength red light absorbing optical lens element 170 includes a long-wavelength light absorbent. The long-wavelength light absorbent can be a commercially available absorbing organometallic compound in the injection molding grade, and the long-wavelength light absorbent is uniformly distributed in the long-wavelength red light absorbing optical lens element 170.

The fourth optical lens element 140 has positive refractive power, both of an object-side surface 141 and an image-side surface 142 of the fourth optical lens element 140 are aspheric, and the fourth optical lens element 140 is made of a plastic material.

The fifth optical lens element 150 has negative refractive power, both of an object-side surface 151 and an image-side surface 152 of the fifth optical lens element 150 are aspheric, and the fifth optical lens element 150 is made of a plastic material.

The cover glass 190 is disposed between the fifth optical lens element 150 and the image plane 195 and will not affect a focal length of the optical image lens assembly.

The IR-cut coating 180 is disposed on an object-side surface (reference number is omitted) of the cover glass 190, that is, the IR-cut coating 180 is located between the optical image lens assembly and the image plane 195, and the IR-cut coating 180 can be penetrated by the visible light and can filter the long-wavelength red light.

Furthermore, the FNO of the optical image lens assembly is 2.00, the CRAmax of the optical image lens assembly is 35.8 degrees, and the TTL/IMGH of the optical image lens assembly is 1.36.

Please refer to Table 1 below.

TABLE 1

| | 1st embodiment | | | | | | | | | |
|---|---|---|---|---|---|---|---|---|---|---|
| | CP (mm) | | | | | CP/CP0 | | | | |
| Field | P1 | P2 | P3 | P4 | P5 | P1 | P2 | P3 | P4 | P5 |
| Axis (0 F) | 0.61 | 0.22 | 0.38 | 0.43 | 0.33 | 1.00 | 1.00 | 1.00 | 1.00 | 1.00 |
| 0.1 F | 0.61 | 0.22 | 0.38 | 0.43 | 0.34 | 1.00 | 1.00 | 1.00 | 0.99 | 1.04 |
| 0.2 F | 0.61 | 0.22 | 0.39 | 0.41 | 0.39 | 1.00 | 1.01 | 1.01 | 0.96 | 1.17 |
| 0.3 F | 0.61 | 0.22 | 0.39 | 0.39 | 0.45 | 1.01 | 1.02 | 1.02 | 0.91 | 1.36 |
| 0.4 F | 0.62 | 0.23 | 0.39 | 0.37 | 0.53 | 1.02 | 1.03 | 1.02 | 0.85 | 1.62 |
| 0.5 F | 0.62 | 0.23 | 0.40 | 0.34 | 0.62 | 1.03 | 1.05 | 1.03 | 0.78 | 1.88 |
| 0.6 F | 0.63 | 0.23 | 0.40 | 0.31 | 0.70 | 1.04 | 1.06 | 1.04 | 0.72 | 2.11 |
| 0.7 F | 0.64 | 0.24 | 0.40 | 0.30 | 0.75 | 1.05 | 1.09 | 1.04 | 0.68 | 2.27 |
| 0.8 F | 0.65 | 0.24 | 0.39 | 0.29 | 0.77 | 1.07 | 1.10 | 1.03 | 0.68 | 2.32 |
| 0.9 F | 0.65 | 0.25 | 0.39 | 0.31 | 0.73 | 1.08 | 1.13 | 1.01 | 0.72 | 2.20 |
| 1.0 F | 0.66 | 0.25 | 0.38 | 0.36 | 0.59 | 1.09 | 1.15 | 0.98 | 0.84 | 1.80 |
| Minimum value of CP/CP0 | | | | | | 1.00 | 1.00 | 0.98 | 0.68 | 1.00 |
| Maximum value of CP/CP | | | | | | 1.09 | 1.15 | 1.04 | 1.00 | 2.32 |

CP (Axis) = CP0

The detailed data of CP and CP/CP0 of each of the optical lens elements of the 1st embodiment are shown in Table 1, wherein the P1 to P5 are, in order from the object side to the image side, the first optical lens element 110, the second optical lens element 120, the long-wavelength red light absorbing optical lens element 170, the fourth optical lens element 140 and the fifth optical lens element 150.

In the 1st embodiment, the long-wavelength red light absorbing optical lens element 170 is the third optical lens element of the optical image lens assembly, and the CP/CP0 thereof falls between 0.98 to 1.04, which is the best in the 1st embodiment. However, if the production factors are considered, the long-wavelength red light absorbing optical lens element 170 can also be disposed as the first optical lens element of the optical image lens assembly, and the CP/CP0 value thereof is between 1.0 and 1.09, which is also excellent.

Please refer to Table 2 below, wherein T is a transmittance of the long-wavelength red light absorbing optical lens element, IT is a transmittance of the IR-cut coating, T4560 is a composite average transmittance in a wavelength range of 450 nm-600 nm of all of the long-wavelength red light absorbing optical lens elements, T6570 is a composite average transmittance in a wavelength range of 650 nm-700 nm of all of the long-wavelength red light absorbing optical lens elements, T6771 is a composite average transmittance in a wavelength range of 670 nm-710 nm of all of the long-wavelength red light absorbing optical lens elements, A550 is an absorbance at a wavelength 550 nm of all of the long-wavelength red light absorbing optical lens elements, A700 is an absorbance at a wavelength 700 nm of all of the long-wavelength red light absorbing optical lens elements, and WLT50 is a wavelength corresponding to a 50% transmittance of the IR-cut coating.

TABLE 2

| Transmittance (%) | | |
| --- | --- | --- |
| Wavelength (nm) | T | IT |
| 730 | 9.14 | 1.44 |
| 725 | 6.36 | 3.38 |
| 720 | 3.97 | 8.87 |
| 715 | 2.74 | 23.20 |
| 710 | 2.29 | 46.69 |
| 705 | 2.11 | 72.79 |
| 700 | 2.09 | 91.39 |
| 695 | 2.22 | 96.02 |
| 690 | 2.91 | 94.16 |
| 685 | 4.79 | 95.02 |
| 680 | 8.22 | 97.25 |
| 675 | 13.05 | 97.57 |
| 670 | 18.14 | 96.47 |
| 665 | 23.07 | 96.38 |
| 660 | 27.38 | 97.58 |
| 655 | 31.66 | 98.39 |
| 650 | 36.72 | 98.34 |
| 645 | 41.68 | 98.30 |
| 640 | 45.98 | 98.69 |
| 635 | 50.08 | 98.59 |
| 630 | 54.43 | 97.93 |
| 625 | 59.18 | 97.29 |
| 620 | 63.96 | 97.17 |
| 615 | 68.10 | 97.95 |
| 610 | 71.19 | 98.62 |
| 605 | 73.90 | 98.61 |
| 600 | 76.48 | 98.64 |
| 595 | 78.54 | 98.58 |
| 590 | 80.62 | 98.71 |
| 585 | 82.24 | 98.61 |
| 580 | 83.42 | 98.93 |
| 575 | 84.50 | 98.72 |
| 570 | 85.72 | 98.20 |
| 565 | 86.39 | 98.22 |
| 560 | 87.20 | 98.07 |
| 555 | 87.56 | 95.69 |
| 550 | 88.04 | 94.76 |
| 545 | 88.33 | 97.05 |
| 540 | 88.42 | 97.46 |
| 535 | 88.70 | 96.21 |
| 530 | 88.90 | 97.52 |
| 525 | 88.82 | 98.43 |
| 520 | 88.97 | 98.26 |
| 515 | 88.85 | 98.57 |
| 510 | 89.13 | 97.80 |
| 505 | 88.94 | 98.12 |
| 500 | 88.82 | 98.58 |
| 495 | 88.78 | 97.39 |
| 490 | 88.66 | 98.17 |
| 485 | 88.53 | 98.43 |
| 480 | 88.03 | 98.80 |
| 475 | 87.49 | 97.99 |
| 470 | 86.67 | 97.19 |
| 465 | 85.14 | 97.87 |
| 460 | 83.28 | 97.91 |

TABLE 2-continued

| Transmittance (%) | | |
| --- | --- | --- |
| 455 | 81.02 | 97.77 |
| 450 | 78.03 | 97.74 |
| Calculated data | | |
| T4560 | | 86% |
| T6570 | | 15% |
| T6771 | | 5.8% |
| A700 | | 1.68 |
| A550 | | 0.06 |
| A700/A550 | | 30.37 |
| WLT50 | | 709 nm |

Absorbance (A) = $-\mathrm{LOG}_{10}$ (Transmittance)

The detailed transmittance data of the long-wavelength red light absorbing optical lens element 170 and the IR-cut coating 180 of the 1st embodiment are shown in Table 2, wherein the WLT50 of the IR-cut coating 180 is 709 nm. However, if the production costs of the IR-cut coating 180 is desired to reduce, the WLT50 can be adjusted to 680 nm to 690 nm so as to broaden the number requirements of the coating layers as well as the production specifications of the IR-cut coating 180. Furthermore, the definitions of the aforementioned parameters in the following embodiments are the same as that in Table 1 and Table 2 of the 1st embodiment, and are not repeated hereafter.

2nd Embodiment

Figure 2:
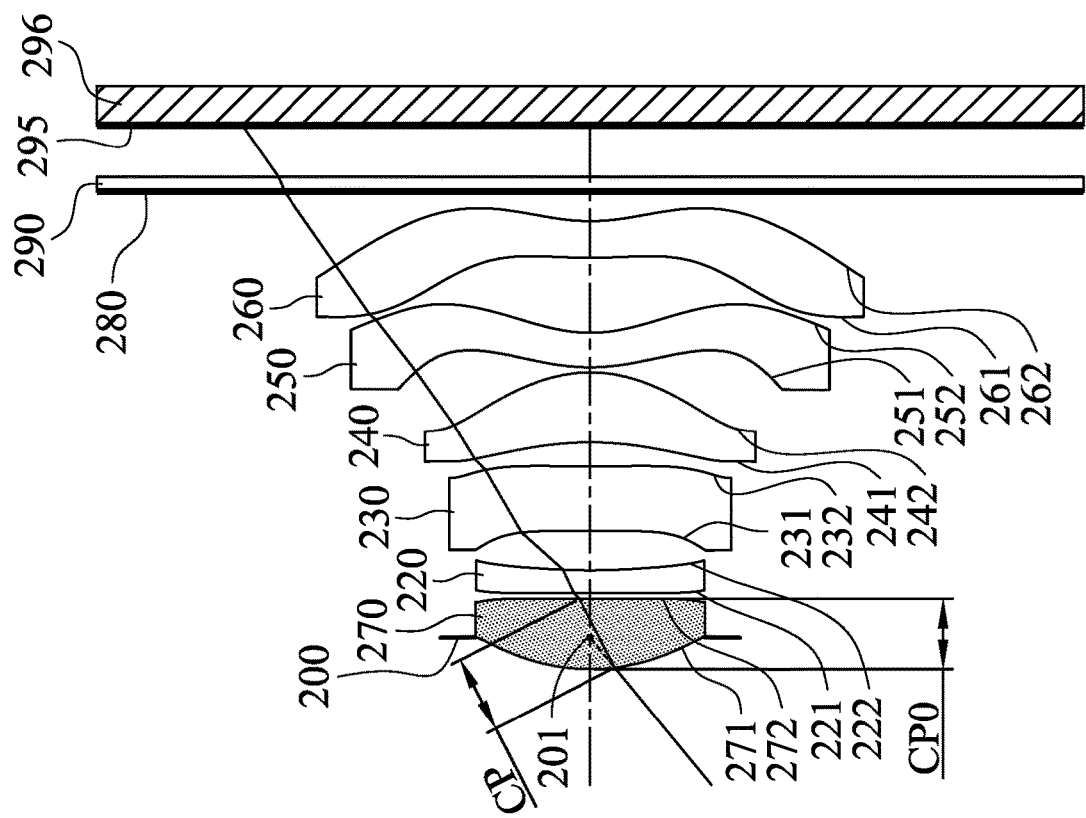
FIG. 2 is a schematic view of an image capturing apparatus according to the 2nd embodiment of the present disclosure.

FIG. 2 is a schematic view of an image capturing apparatus according to the 2nd embodiment of the present disclosure. As shown in FIG. 2, the image capturing apparatus of the 2nd embodiment includes an optical image lens assembly (reference number is omitted) and an image sensor 296. The optical image lens assembly a center of an entrance pupil 201. The optical image lens assembly includes, in order from an object-side to an image-side, an aperture stop 200, a long-wavelength red light absorbing optical lens element 270, a second optical lens element 220, a third optical lens element 230, a fourth optical lens element 240, a fifth optical lens element 250, a sixth optical lens element 260, an IR-cut coating 280, a cover glass 290 and an image plane 295, wherein the image sensor 296 is disposed on the image plane 295 of the optical image lens assembly.

The aperture stop 200 is for controlling a maximum entering amount of light in a center of an imaging area of the optical image lens assembly.

The long-wavelength red light absorbing optical lens element 270 has positive refractive power, and both of an object-side surface 271 and an image-side surface 272 of the long-wavelength red light absorbing optical lens element 270 are aspheric. The long-wavelength red light absorbing optical lens element 270 is disposed adjacent to the aperture stop 200. The long-wavelength red light absorbing optical lens element 270 is made of a thermoplastic material and formed by an injection molding method, wherein the thermoplastic material is a COC/COP material. The long-wavelength red light absorbing optical lens element 270 includes a long-wavelength light absorbent, and the long-wavelength light absorbent can be a commercially available absorbing organometallic compound in the injection molding grade, and the long-wavelength light absorbent is uniformly distributed in the long-wavelength red light absorbing optical lens element 270.

The second optical lens element 220 has negative refractive power, both of an object-side surface 221 and an image-side surface 222 of the second optical lens element 220 are aspheric, and the second optical lens element 220 is made of a plastic material and formed by an injection molding method, wherein the plastic material is a high refractive polycarbonate (PC) material such as the EP series of MGC or the SP series of TEIJIN.

The third optical lens element 230 has negative refractive power, both of an object-side surface 231 and an image-side surface 232 of the third optical lens element 230 are aspheric, and the third optical lens element 230 is made of a plastic material.

The fourth optical lens element 240 has positive refractive power, both of an object-side surface 241 and an image-side surface 242 of the fourth optical lens element 240 are aspheric, and the fourth optical lens element 240 is made of a plastic material.

The fifth optical lens element 250 has negative refractive power, both of an object-side surface 251 and an image-side surface 252 of the fifth optical lens element 250 are aspheric surface, and the fifth optical lens element 250 is made of a plastic material.

The sixth optical lens element 260 has negative refractive power, both of an object-side surface 261 and an image-side surface 262 of the sixth optical lens element 260 are aspheric, and the sixth optical lens element 260 is made of a plastic material.

The cover glass 290 is disposed between the sixth optical lens element 260 and the image plane 295 and will not affect a focal length of the optical image lens assembly.

The IR-cut coating 280 is disposed on an object-side surface (reference number is omitted) of the cover glass 290, that is, the IR-cut coating 280 is located between the optical image lens assembly and the image plane 295, and the IR-cut coating 280 can be penetrated by the visible light and can filter the long-wavelength red light.

The material of cesium oxide compound, such as CsWOx, can be used to replace with the IR-cut coating 280, and the material of cesium oxide compound can be disposed on surfaces of the optical lens elements or uniformly distributed in the optical lens elements so that the filtering demands of the infrared light can be satisfied and the absorption of the visible light can be reduced. Therefore, the IR-cut coating 280 can be selectively replaced when the aforementioned material of cesium oxide compound is used in the optical image lens assembly.

Furthermore, the FNO of the optical image lens assembly is 1.80, the CRAmax of the optical image lens assembly is 35.0 degrees, and the TTL/IMGH of the optical image lens assembly is 1.48.

Please refer to Table 3 below.

TABLE 3

2nd embodiment

| Field | CP (mm) | | | | | | CP/CP0 | | | | | |
|---|---|---|---|---|---|---|---|---|---|---|---|---|
| | P1 | P2 | P3 | P4 | P5 | P6 | P1 | P2 | P3 | P4 | P5 | P6 |
| Axis (0 F) | 0.55 | 0.23 | 0.93 | 0.43 | 0.36 | 0.45 | 1.00 | 1.00 | 1.00 | 1.00 | 1.00 | 1.00 |
| 0.1 F | 0.55 | 0.23 | 0.93 | 0.43 | 0.35 | 0.46 | 1.00 | 1.00 | 1.00 | 1.00 | 0.99 | 1.02 |
| 0.2 F | 0.55 | 0.23 | 0.92 | 0.43 | 0.34 | 0.50 | 1.01 | 1.01 | 1.00 | 1.01 | 0.97 | 1.10 |
| 0.3 F | 0.56 | 0.23 | 0.92 | 0.44 | 0.33 | 0.56 | 1.01 | 1.02 | 0.99 | 1.02 | 0.94 | 1.23 |
| 0.4 F | 0.56 | 0.24 | 0.91 | 0.44 | 0.33 | 0.63 | 1.02 | 1.03 | 0.98 | 1.03 | 0.92 | 1.40 |
| 0.5 F | 0.57 | 0.24 | 0.90 | 0.44 | 0.33 | 0.71 | 1.03 | 1.04 | 0.97 | 1.04 | 0.92 | 1.57 |
| 0.6 F | 0.57 | 0.24 | 0.88 | 0.45 | 0.34 | 0.77 | 1.04 | 1.06 | 0.95 | 1.05 | 0.95 | 1.71 |
| 0.7 F | 0.58 | 0.25 | 0.85 | 0.45 | 0.36 | 0.82 | 1.05 | 1.08 | 0.92 | 1.06 | 1.01 | 1.81 |
| 0.8 F | 0.59 | 0.25 | 0.82 | 0.46 | 0.39 | 0.84 | 1.07 | 1.10 | 0.89 | 1.08 | 1.09 | 1.87 |
| 0.9 F | 0.59 | 0.26 | 0.78 | 0.47 | 0.41 | 0.85 | 1.08 | 1.12 | 0.84 | 1.11 | 1.15 | 1.88 |
| 1.0 F | 0.60 | 0.26 | 0.72 | 0.50 | 0.43 | 0.80 | 1.09 | 1.14 | 0.78 | 1.16 | 1.22 | 1.77 |
| Minimum value of CP/CP0 | | | | | | | 1.00 | 1.00 | 0.78 | 1.00 | 0.92 | 1.00 |
| Maximum value of CP/CP0 | | | | | | | 1.09 | 1.14 | 1.00 | 1.16 | 1.22 | 1.88 |

CP (Axis) = CP0

The detailed data of CP and CP/CP0 of each of the optical lens elements of the 2nd embodiment are shown in Table 3, wherein the P1 to P6 are, in order from the object side to the image side, the long-wavelength red light absorbing optical lens element 270, the second optical lens element 220, the third optical lens element 230, the fourth optical lens element 240, the fifth optical lens element 250 and the sixth optical lens element 260.

In the 2nd embodiment, the long-wavelength red light absorbing optical lens element 270 of the optical image lens assembly is the first optical lens element of the optical image lens assembly, and the CP/CP0 thereof falls between 1.00-1.09, which is the best in the 2nd embodiment. However, if the production factors are considered, the long-wavelength red light absorbing optical lens element 270 can also be disposed as the second optical lens element of the optical image lens assembly, and the CP/CP0 thereof is between 1.00-1.14, which is also excellent.

Please refer to Table 4 below.

TABLE 4

| Transmittance (%) | | |
|---|---|---|
| Wavelength (nm) | T | IT |
| 730 | 6.90 | 1.44 |
| 725 | 5.18 | 3.38 |
| 720 | 4.85 | 8.87 |
| 715 | 3.46 | 23.20 |
| 710 | 2.15 | 46.69 |
| 705 | 1.71 | 72.79 |
| 700 | 1.47 | 91.39 |
| 695 | 1.46 | 96.02 |
| 690 | 1.46 | 94.16 |
| 685 | 1.82 | 95.02 |
| 680 | 3.02 | 97.25 |
| 675 | 5.90 | 97.57 |
| 670 | 9.74 | 96.47 |
| 665 | 14.01 | 96.38 |
| 660 | 18.29 | 97.58 |
| 655 | 22.18 | 98.39 |
| 650 | 26.96 | 98.34 |
| 645 | 33.41 | 98.30 |
| 640 | 39.78 | 98.69 |

TABLE 4-continued

| Transmittance (%) | | |
|---|---|---|
| 635 | 44.63 | 98.59 |
| 630 | 48.73 | 97.93 |
| 625 | 53.49 | 97.29 |
| 620 | 58.59 | 97.17 |
| 615 | 63.78 | 97.95 |
| 610 | 67.97 | 98.62 |
| 605 | 70.73 | 98.61 |
| 600 | 73.43 | 98.64 |
| 595 | 75.85 | 98.58 |
| 590 | 78.37 | 98.71 |
| 585 | 80.55 | 98.61 |
| 580 | 82.25 | 98.93 |
| 575 | 83.47 | 98.72 |
| 570 | 84.83 | 98.20 |
| 565 | 85.78 | 98.22 |
| 560 | 86.73 | 98.07 |
| 555 | 87.30 | 95.69 |
| 550 | 87.91 | 94.76 |
| 545 | 88.11 | 97.05 |
| 540 | 88.38 | 97.46 |
| 535 | 88.67 | 96.21 |
| 530 | 88.75 | 97.52 |
| 525 | 88.76 | 98.43 |
| 520 | 88.80 | 98.26 |
| 515 | 88.80 | 98.57 |
| 510 | 88.85 | 97.80 |
| 505 | 88.86 | 98.12 |
| 500 | 88.69 | 98.58 |
| 495 | 88.50 | 97.39 |
| 490 | 88.48 | 98.17 |
| 485 | 88.43 | 98.43 |
| 480 | 88.08 | 98.80 |
| 475 | 87.94 | 97.99 |
| 470 | 86.39 | 97.19 |
| 465 | 85.26 | 97.87 |
| 460 | 83.40 | 97.91 |
| 455 | 80.53 | 97.77 |
| 450 | 77.46 | 97.74 |

| Calculated data | |
|---|---|
| T4560 | 85% |
| T6570 | 9.3% |
| T6771 | 2.9% |
| A700 | 1.83 |
| A550 | 0.06 |
| A700/A550 | 32.75 |
| WLT50 | 709 nm |

Absorbance (A) = − LOG$_{10}$ (Transmittance)

The detailed transmittance data of the long-wavelength red light absorbing optical lens element 270 and the IR-cut coating 280 of the 2nd embodiment are shown in Table 4, wherein the WLT50 of the IR-cut coating 280 is 709 nm.

The definitions of the aforementioned parameters in the 2nd embodiment are the same as that in the 1st embodiment, and are not repeated hereafter.

3rd Embodiment

Figure 3:
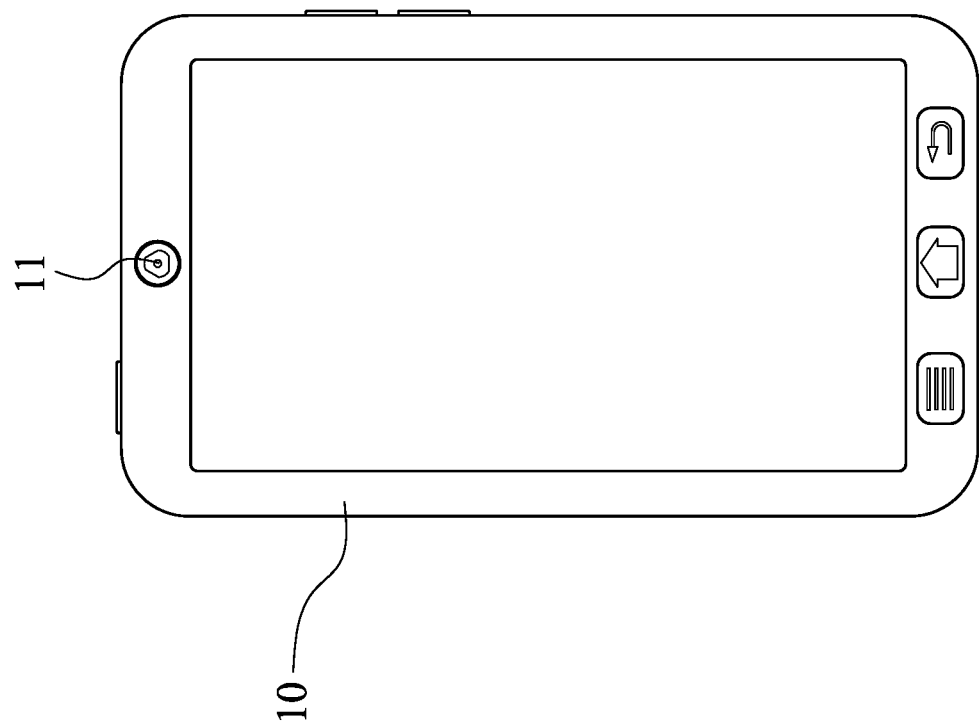
FIG. 3 is a schematic view of an electronic device according to the 3rd embodiment of the present disclosure.

FIG. 3 is a schematic view of an electronic device 10 according to the 3rd embodiment of the present disclosure. The electronic device 10 of the 3rd embodiment is a smart phone, and the electronic device 10 includes an image capturing apparatus 11. The image capturing apparatus 11 includes the optical image lens assembly according to the present disclosure (not shown) and an image sensor (not shown), wherein the image sensor is disposed on the image plane of the optical image lens assembly.

4th Embodiment

Figure 4:
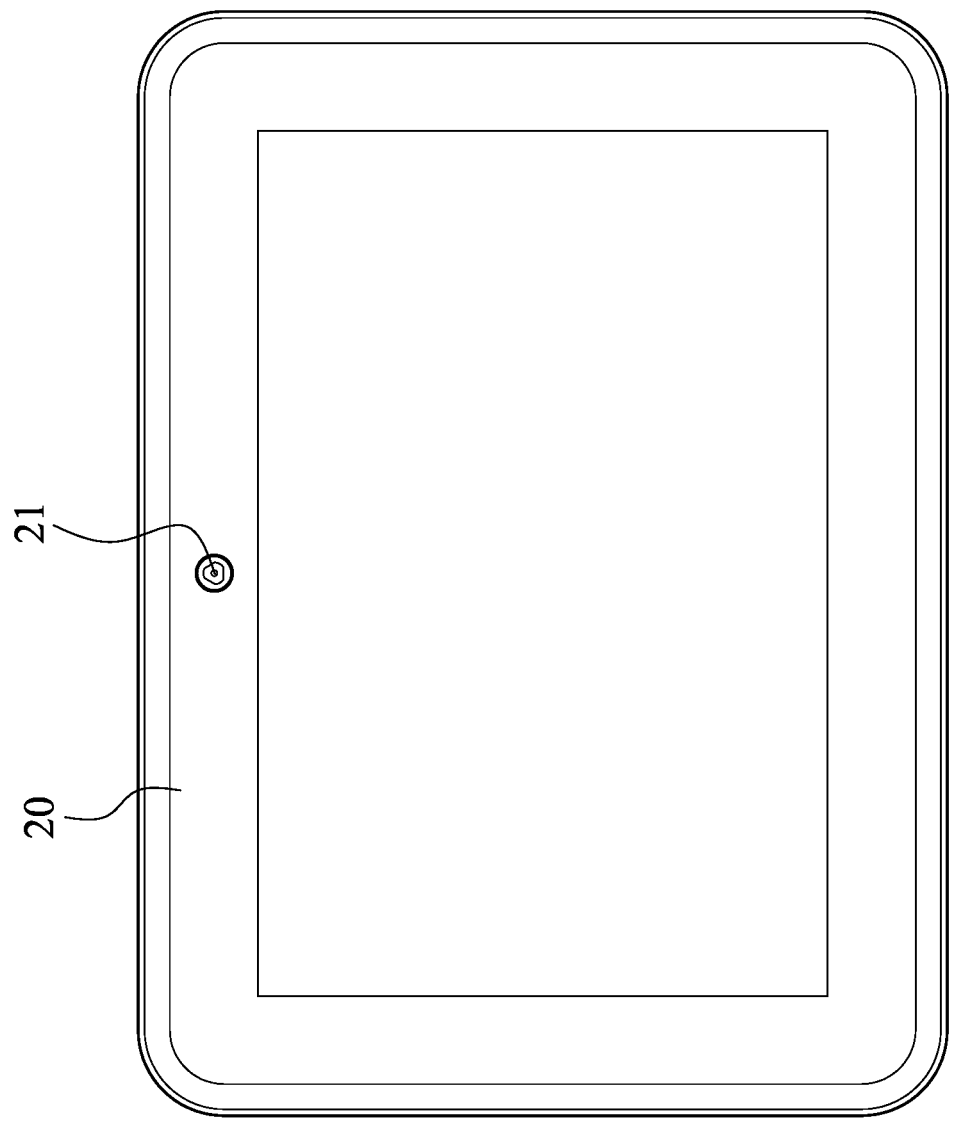
FIG. 4 is a schematic view of an electronic device according to the 4th embodiment of the present disclosure.

FIG. 4 is a schematic view of an electronic device 20 according to the 4th embodiment of the present disclosure. The electronic device 20 of the 4th embodiment is a tablet, and the electronic device 20 includes an image capturing apparatus 21. The image capturing apparatus 21 includes the optical image lens assembly according to the present disclosure (not shown) and an image sensor (not shown), wherein the image sensor is disposed on the image plane of the optical image lens assembly.

5th Embodiment

Figure 5:
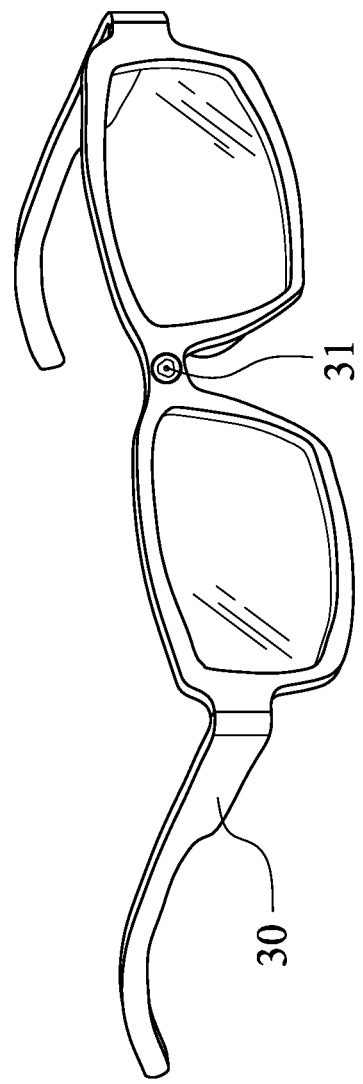
FIG. 5 is a schematic view of an electronic device according to the 5th embodiment of the present disclosure.

FIG. 5 is a schematic view of an electronic device 30 according to the 5th embodiment of the present disclosure. The electronic device 30 of the 5th embodiment is a wearable device, and the electronic device 30 includes an image capturing apparatus 31. The image capturing apparatus 31 includes the optical image lens assembly according to the present disclosure (not shown) and an image sensor (not shown), wherein the image sensor is disposed on the image plane of the optical image lens assembly.

The foregoing description, for purpose of explanation, has been described with reference to specific embodiments. It is to be noted that Tables show different data of the different embodiments; however, the data of the different embodiments are obtained from experiments. The embodiments were chosen and described in order to best explain the principles of the disclosure and its practical applications, to thereby enable others skilled in the art to best utilize the disclosure and various embodiments with various modifications as are suited to the particular use contemplated. The embodiments depicted above and the appended drawings are exemplary and are not intended to be exhaustive or to limit the scope of the present disclosure to the precise forms disclosed. Many modifications and variations are possible in view of the above teachings.

What is claimed is:

1. An optical image lens assembly, comprising:
a plurality of optical lens elements, wherein the optical lens elements comprise a plurality of plastic optical lens elements having refractive power and aspheric surfaces;
wherein at least one long-wavelength red light absorbing optical lens element made of a plastic material and having refractive power is disposed in the optical image lens assembly, and the long-wavelength red light absorbing optical lens element can be penetrated by a visible light and can filter a long-wavelength red light;
wherein a transmitted distance of a chief ray passing through the long-wavelength red light absorbing optical lens element between a central field of view to a field of view in 1.0 region in an imaging region of the optical image lens assembly is CP, a transmitted distance of the chief ray passing through the long-wavelength red light absorbing optical lens element in the central field of the optical image lens assembly is CP0, and the following condition is satisfied:

$0.5 \leq CP/CP0 \leq 2.0$.

2. The optical image lens assembly of claim 1, wherein a composite average transmittance in a wavelength range of 650 nm-700 nm of all of the long-wavelength red light absorbing optical lens elements is T6570, a composite average transmittance in a wavelength range of 450 nm-600 nm of all of the long-wavelength red light absorbing optical lens elements is T4560, and the following conditions are satisfied:

$T6570 \leq 50\%$; and $T4560 \geq 80\%$.

3. The optical image lens assembly of claim 2, wherein the transmitted distance of the chief ray passing through the long-wavelength red light absorbing optical lens element between the central field of view to the field of view in 1.0 region in the imaging region of the optical image lens assembly is CP, the transmitted distance of the chief ray passing through the long-wavelength red light absorbing optical lens element in the central field of the optical image lens assembly is CP0, and the following condition is satisfied:

$0.8 \leq CP/CP0 \leq 1.2$.

4. The optical image lens assembly of claim 2, wherein the long-wavelength red light absorbing optical lens element has refractive power and aspheric surfaces and is formed by an injection molding method.

5. The optical image lens assembly of claim 4, wherein the plastic material of the long-wavelength red light absorbing optical lens element is a thermoplastic material.

6. The optical image lens assembly of claim 5, wherein the long-wavelength red light absorbing optical lens element comprises a long-wavelength light absorbent uniformly distributed in the long-wavelength red light absorbing optical lens element.

7. The optical image lens assembly of claim 5, wherein the transmitted distance of the chief ray passing through the long-wavelength red light absorbing optical lens element between the central field of view to the field of view in 1.0 region in the imaging region of the optical image lens assembly is CP, the transmitted distance of the chief ray passing through the long-wavelength red light absorbing optical lens element in the central field of the optical image lens assembly is CP0, and the following condition is satisfied:

$0.8 \leq CP/CP0 \leq 1.2$.

8. The optical image lens assembly of claim 5, wherein a composite average transmittance in a wavelength range of 670 nm-710 nm of all of the long-wavelength red light absorbing optical lens elements is T6771, an absorbance at a wavelength 700 nm of all of the long-wavelength red light absorbing optical lens elements is A700, an absorbance at a wavelength 550 nm of all of the long-wavelength red light absorbing optical lens elements is A550, and the following conditions are satisfied:

$T6771 \leq 20\%$; and $A700/A550 \geq 10$.

9. The optical image lens assembly of claim 5, further comprising:
an aperture stop, wherein the long-wavelength red light absorbing optical lens element is disposed adjacent to the aperture stop, and the long-wavelength red light absorbing optical lens element has positive refractive power in a paraxial region thereof.

10. The optical image lens assembly of claim 5, further comprising:
an image plane dispose on an image side of the optical image lens assembly, wherein an IR-cut coating is disposed in the optical image lens assembly or is disposed between one of the optical lens elements and the image plane.

11. The optical image lens assembly of claim 10, wherein the IR-cut coating can be penetrated by the visible light and can filter the long-wavelength red light, a wavelength corresponding to a 50% transmittance of the IR-cut coating is WLT50, and the following condition is satisfied:

$WLT50 \geq 670$ nm.

12. The optical image lens assembly of claim 11, wherein the wavelength corresponding to the 50% transmittance of the IR-cut coating is WLT50, and the following condition is satisfied:

$WLT50 \geq 690$ nm.

13. The optical image lens assembly of claim 11, wherein the wavelength corresponding to the 50% transmittance of the IR-cut coating is WLT50, and the following condition is satisfied:

$WLT50 \leq 730$ nm.

14. The optical image lens assembly of claim 11, further comprising:
a cover glass disposed on an object side of the image plane, and the IR-cut coating is disposed on at least one surface of the cover glass.

15. The optical image lens assembly of claim 11, wherein a number of the long-wavelength red light absorbing optical lens element is one.

16. The optical image lens assembly of claim 11, wherein the transmitted distance of the chief ray passing through the long-wavelength red light absorbing optical lens element between the central field of view to the field of view in 1.0 region in the imaging region of the optical image lens assembly is CP, the transmitted distance of the chief ray passing through the long-wavelength red light absorbing optical lens element in the central field of the optical image lens assembly is CP0, and the following condition is satisfied:

$0.8 \leq CP/CP0 \leq 1.2$.

17. The optical image lens assembly of claim 11, wherein a composite average transmittance in a wavelength range of 670 nm-710 nm of all of the long-wavelength red light absorbing optical lens elements is T6771, an absorbance at wavelength 700 nm of all of the long-wavelength red light absorbing optical lens elements is A700, an absorbance at wavelength 550 nm of all of the long-wavelength red light absorbing optical lens elements is A550, and the following condition is satisfied:

$T6771 \leq 20\%$; and $A700/A550 \geq 10$.

18. The optical image lens assembly of claim 11, further comprising:
an aperture stop, wherein the long-wavelength red light absorbing optical lens element is disposed adjacent to the aperture stop, and the long-wavelength red light absorbing optical lens element has positive refractive power in a paraxial region thereof.

19. The optical image lens assembly of claim 2, further comprising:
an image plane disposed on an image-side of the optical image lens assembly, wherein an IR-cut coating is disposed in the optical image lens assembly or is disposed between one of the optical lens elements and the image plane.

20. The optical image lens assembly of claim 19, wherein the IR-cut coating can be penetrated by the visible light and can filter the long-wavelength red light, a wavelength corresponding to a 50% transmittance of the IR-cut coating is WLT50, and the following condition is satisfied:

$WLT50 \geq 670$ nm.

21. The optical image lens assembly of claim 19, wherein the wavelength corresponding to the 50% transmittance of the IR-cut coating is WLT50, and the following condition is satisfied:

$WLT50 \geq 690$ nm.

22. The optical image lens assembly of claim 19, wherein the wavelength corresponding to the 50% transmittance of the IR-cut coating is WLT50, and the following condition is satisfied:

$WLT50 \leq 730$ nm.

23. The optical image lens assembly of claim 1, wherein a composite average transmittance in a wavelength range of 670 nm-710 nm of all of the long-wavelength red light absorbing optical lens elements is T6771, an absorbance at a wavelength 700 nm of all of the long-wavelength red light absorbing optical lens elements is A700, an absorbance at a wavelength 550 nm of all of the long-wavelength red light absorbing optical lens elements is A550, and the following conditions are satisfied:

$T6771 \leq 20\%$; and $A700/A550 \geq 10$.

24. The optical image lens assembly of claim 1, further comprising:

an aperture stop, wherein the long-wavelength red light absorbing optical lens element is disposed adjacent to the aperture stop, and the long-wavelength red light absorbing optical lens element has positive refractive power in a paraxial region thereof.

25. The optical image lens assembly of claim 1, wherein an f-number of the optical image lens assembly is FNO, a maximum chief ray angle of the optical image lens assembly is CRAmax, a distance from an object side of the optical image lens assembly to an image plane thereof is TTL, a maximum image height of the optical image lens assembly is IMGH, and the following conditions are satisfied:

$FNO \leq 2.4$;

$CRA\ max \geq 20$; and $0.8 \leq TTL/IMGH \leq 3.0$.

26. An image capturing apparatus, comprising:
the optical image lens assembly of claim 1; and
an image sensor disposed on an image plane of the optical image lens assembly.

27. An electronic device, which is a mobile device, comprising:
the image capturing apparatus of claim 26.

* * * * *